United States Patent Office 3,118,934
Patented Jan. 21, 1964

3,118,934
METHOD OF MAKING OZONATION PRODUCTS
OF PHENANTHRENE
Robert H. Callighan and John O. Hawthorne, Pittsburgh, Pa., assignors to United States Steel Corporation, a corporation of New Jersey
No Drawing. Filed Dec. 12, 1960, Ser. No. 75,086
4 Claims. (Cl. 260—523)

This invention relates to a method of making ozonation products of phenanthrene, especially 2,2'-diphenic acid and 2,2'-biphenyldicarboxaldehyde.

This is a continuation-in-part of our applications Serial No. 808,553 and Serial No. 808,554, filed April 24, 1959; and Serial No. 5,101, filed January 28, 1960, now abandoned.

2,2'-biphenyldicarboxaldehyde is useful in making an azepine, the phosphate salt of which is marketed as a vasodilator under the trademark "Ilidar." It can also be oxidized to 2,2'-diphenic acid, which is a resin intermediate. No simple method has been known, however, for making the dialdehyde from a readily available source material. It is accordingly an object of our invention to provide a method of making 2,2'biphenyldicarboxaldehyde by the ozonolysis of phenanthrene.

2,2'-diphenic acid is used in the plastics industry (Patent No. 2,786,076) but the consumption thereof has been limited by its cost. A further object of our invention, therefore, is to provide a method of producing the acid cheaply from an inexpensive starting material.

Bailey Patents Nos. 2,870,194 and 2,888,485 disclose methods of making 2,2'-biphenyldicarboxaldehyde and 2,2'-diphenic acid by the ozonation of phenanthrene in a primary or secondary alcohol. The disadvantages of those methods are the use of a low reaction temperature and an expensive reducing agent, sodium iodide, for the preparation of the dialdehyde; and the use of a chemical oxidizing agent such as hydrogen peroxide for the preparation of diphenic acid.

Our invention consists in the ozonation of phenanthrene while suspended in an aliphatic ketone or tertiary butyl alcohol until at least approximately one molar equivalent of ozone has reacted with one mole of phenanthrene. This ozonation permits recovery of the dialdehyde directly by reatment with sodium bicarbonate without the isolation of intermediates or the necessity for a reducing reaction. We may, however, ammoniate the ozonation reaction product to form 5-hydroxy-5H-dibenz[c,e,]azepine. The latter may be used to make other useful compounds or may be subjected to acid hydrolysis to give the dialdehyde (2,2'-biphenyldicarboxaldehyde) in the preferred method of dialdehyde recovery and purification when the phenanthrene charged is of less than 98% purity.

If the ozonation of the phenanthrene be continued until approximately 3.2 molar equivalents of ozone have reacted with phenanthrene, the product is diphenic acid.

The reactions involved in our invention are illustrated below:

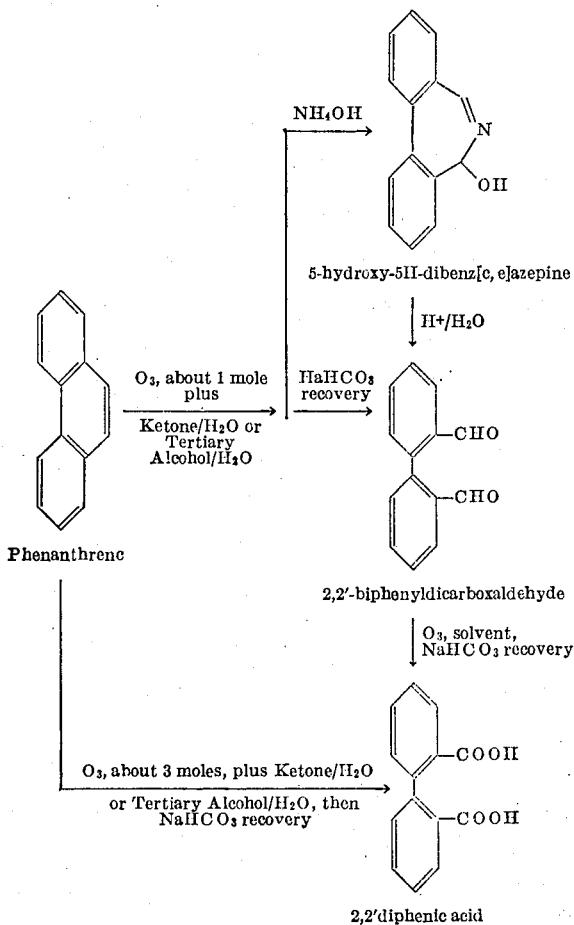

The ozonation may be carried out at temperatures from −10 to 40° C. but ambient temperatures (30–40° C.) are preferred.

A complete understanding of the invention may be obtained from the following detailed explanation of the procedure carried out in several specific examples.

*Example 1*

40 grams of phenanthrene (225 millimoles) was stirred in 600 ml. of 87.5% aqueous tertiary butyl alcohol and ozonized for 4 hours at room temperature until 258 millimoles of ozone had combined. Ozonation was effected by bubbling through the suspension a stream of oxygen containing 2.33 weight percent ozone. Half of the resulting solution was treated with 200 ml. of 3.5% aqueous sodium bicarbonate. A molecular ratio of the salt to phenanthrene of from 0.5 to 3 may be used. This gives the solution a pH value of about 8. The azeotrope of tertiary butyl alcohol and water was distilled off and the remaining water-oil mixture was extracted with chloroform. On separation of the chloroform layer and evaporation, 18.2 grams of 2,2'-biphenyldicarboxaldehyde was obtained, melting between 57 and 60° C. Acidification of the aqueous layer precipitated a mixture of diphenic and 2-formyl-2'-biphenylcarboxylic acids.

The remainder of the solution containing ozonolysis products was treated with 200 ml. of 28% ammonium hydroxide. The molecular ratio of hydroxide to phenanthrene should be at least 1. A ratio in excess of 3 gives no advantage. The resulting pH is above 9. After 3 minutes, 300 ml. of water was added and the mixture left to stand 15 minutes. A precipitate of 5-hydroxy-5H-dibenz[c,e] azepine formed and was collected. The azepine was dissolved in 100 ml. of 10% hydrochloric acid and the solution heated to boiling. On cooling, 16.7 grams of the 2,2'-biphenyldicarboxaldehyde formed by hydrolysis was precipitated and collected and found to melt in the range 60–61° C. This represented a 70.7% yield.

The amount of tertiary butyl alcohol (87.5% aqueous solution) used may be from 200 to 800 ml. and the amount of ozone combined may be from 225 to 275 millimoles.

We have found that 2,2'-biphenyldicarboxaldehyde can also be prepared from the ozonolysis of phenanthrene in solvent systems other than tertiary butyl alcohol and water. A summary of these data is given below per 10 grams of phenanthrene using the sodium-bicarbonate method of isolation.

| Solvent | Yield Dialdehyde, percent | Carboxylic Acids, g. |
| --- | --- | --- |
| n-Heptane (200 ml)-tertiary butyl alcohol (10 ml.) | 58 | 1.7 |
| Ethylacetate (175 ml.)-tertiary butyl alcohol (10 ml.)-water (25 ml.) | 85 | 1.3 |
| Ethylene dichloride (175 ml.)-tertiary butyl alcohol (10 ml.)-water (25 ml.) | 72 | 2.7 |

The general ozonation procedure was to suspend or dissolve purified phenanthrene in the appropriate solvent and pass ozone in oxygen through the mixture for an hour at room temperature (2.3 weight percent ozone at a flow rate of 0.06 s.c.f.m.; 1.15 moles of ozone per mole of phenanthrene). With the exception of the test involving the n-heptane mixture, aqueous 7% sodium bicarbonate (200 ml.) was added to the ozonation mixture in each test, and solvent was removed by atmospheric distillation to a head temperature of 95° C. The molten dialdehyde suspended in the bicarbonate solution was extracted into chloroform. After separation of the chloroform phase, the chloroform was removed by evaporation leaving the dialdehyde as the residue. Acidification of the sodium bicarbonate solution precipitated the carboxylic acids.

In the case of the n-heptane mixture with tertiary butyl alcohol, a solid product precipitated from the ozonation mixture. This material was separated by decantation of the solvent and dissolved in benzene (100 ml.). This solution was treated with aqueous sodium bicarbonate as above.

With aqueous n-butyl alcohol as the ozonation medium no dialdehyde could be identified in the materials recovered.

Example II

Purified phenanthrene (10 grams or 56.2 millimoles) in 87.5 volume percent aqueous acetone (100 ml.) was ozonized with 1.15 molar equivalents of ozone at room temperature (2.3 weight percent ozone in oxygen at a flow rate of 0.06 s.c.f.m.). Aqueous 7% sodium bicarbonate (75 ml.) was added to the ozonation solution, and the acetone was removed by distillation at atmospheric pressure to a head temperature of 95° C. The pot residue was cooled, and the solid dialdehyde was collected. The product weighed 9.47 grams (80.3% yield) and melted at 57 to 60° C. The melting point of a mixture with authentic 2,2'-biphenyldicarboxaldehyde was not depressed; thus, the identity of the product was established. Acidification of the sodium bicarbonate solution precipitated 1.5 grams of carboxylic acid.

Example III

The same procedure was used as in Example II, except that 87.5 volumes of methyl ethyl ketone were mixed with 12.5 volumes of water to form the reaction medium. Ozone was used only to the extent of 1.02 molar equivalents of ozone. This proportion of water was not completely miscible with the ketone; a two-phase mixture resulted. The yield of the dialdehyde was 10.28 grams melting at 58 to 60° C. (86% yield). Recovered carboxylic acids weighed 0.9 gram.

Example IV

Purified phenanthrene (10 grams or 56.2 millimoles) in 87.5 volume percent aqueous acetone (100 ml.) was ozonized with 1.15 molar equivalents of ozone at room temperature (2.3 weight percent ozone in oxygen at a flow rate of 0.06 s.c.f.m.). After the ozonation, the solution was cooled to 10° C. and ammonium hydroxide (10 ml. of 28% ammonium hydroxide, diluted to 25 ml.) was slowly added. The temperature rose to 20° C. and was maintained at this point. Crystals of 5-hydroxy-5H-dibenz[c,e]azepine formed. Water (25 ml.) was added and the crystals collected after 10 minutes. After the filter cake was washed with water, the azepine was mixed with water, then hydrochloric acid (25 ml. of 1 part concentrated hydrochloric acid and 9 parts water) was added at 10° C. The insoluble material was collected and washed. The filtrate was heated to 40° C. and stirred until hydrolysis was complete (approximately 3 hours at 35 to 40° C.). Hydrolysis occurs in the presence of water at room temperature but the rate of hydrolysis is greater at higher temperature. The dialdehyde separates as an oil when the solution is above the melting point of the dialdehyde. The crystalline dialdehyde was collected, washed with water and dried. The product weighed 7.56 grams (64.2% yield) and melted at 58 to 60° C.

Example V

The ozonation procedure was the same as in Example IV. The ozonation solution was cooled to 8° C. and anhydrous ammonia was passed through the solution below 20° C. until the solution became cloudy. Water (200 ml.) was added, and the crystalline azepine was precipitated, collected and washed. The azepine was treated with hydrochloric acid, and the dialdehyde was isolated as in Example IV. The yield was 45.7% (5.4 grams) of dialdehyde melting at 56 to 58° C.

Example VI

The procedure was the same as in Example II except that the technical grade acetone, normally containing 1 to 2% water, was dried over anhydrous potassium carbonate. The dialdehyde, isolated by chloroform extraction, weighed 8.8 grams (74.6% yield). However, the product, remaining an oil, was not as pure as that obtained in Example II. Recovered carboxylic acids weighed 2.5 grams.

Example VII

The ozonation procedure was the same as in Example II, except that the reaction medium was methyl isobutyl ketone (195 ml.) and water (6 ml.). After adding 7% sodium bicarbonate solution (200 ml.), the mixture was refluxed at 88° C. with stirring for 20 minutes. After cooling, the organic phase was separated, washed with water and removed by evaporation to leave 10.0 grams of dialdehyde (84.7% yield). The product was gummy. An infrared spectral curve showed it to be impure dialdehyde.

The dialdehyde product of our method may be used as a starting material for other compounds as shown by the following examples:

2,2'-biphenyldicarboxaldehyde (4.2 grams) and allylamine (3 ml.) were refluxed in 20 ml. of methanol for 5 minutes. To the cooled solution, 15 grams of sodium hydrosulfite in 75 ml. of water were added and the mixture refluxed for 30 minutes. The oil which separated was extracted in diethyl ether. The ether phase was washed with water and dried over potassium hydroxide. Anhydrous hydrogen chloride was passed into the solution to precipitate a 90% yield of crude 6-allyl-6,7-dihydro-5H-dibenz[c,e]azepine hydrochloride melting in the range of 190° to 200° C. Recrystallization from methanol-diethyl ether gave a 57% yield of product melting in the range 214 to 215° C. This azepine, as the phosphate salt, is marketed under the trademark "Ildar" as a vasodilator.

The dialdehyde can also be oxidized to 2,2'-diphenic acid, a resin intermediate, by the following procedure: A solution of 2,2'-biphenyldicarboxaldehyde (5.0 grams) in tertiary butyl alcohol was treated with 2.24 grams ozone (5 weight percent conc.) at room temperature. A 7% aqueous sodium bicarbonate solution (130 ml.) was added and the tertiary butyl alcohol removed by distillation. The aqueous pot residue was filtered, then acidified (pH 1) by hydrochloric acid. The precipitated 2,2'-diphenic acid weighed 5.4 grams (93.7% yield) and melted in the range 222 to 228° C.

It will be evident from the foregoing that our method consists in the ozonation of phenanthrene suspended in tertiary butyl alcohol or an aliphatic ketone of the general formula R—CO—R' where R' may be the same as R and is a $C_1$ to $C_4$ alkyl radical. The amount of phenanthrene should be less than 20% by weight of the suspending medium. The amount of ozone per mole of phenanthrene may be from 0.9 to 1.2 moles.

Our method of ozonation may also be used to produce 2,2'-diphenic acid directly. In general, our method of making 2,2'-diphenic acid is as follows: A solution (or suspension) of phenanthrene is tertiary butyl alcohol or aqueous aliphatic ketone is ozonized at room temperature until from 2 to 3.5, preferably approximately 3.2, molecular equivalents of ozone per mole of phenanthrene have passed into the reaction mixture. Aqueous sodium-bicarbonate solution is added to the reaction mixture, and the solvent removed by distillation. Any insoluble material is removed from the bicarbonate solution by extraction with chloroform. When the aqueous bicarbonate solution is acidified, diphenic acid precipitates and is removed by filtration.

Further details are given in the following typical examples:

Example VIII

A solution of 10 grams of purified phenanthrene in a mixture of 175 ml. of acetone and 25 ml. of water was treated with approximately 2.3 weight percent ozone at room temperature and a flow rate of 102 liters per hour for 2 hours and 48 minutes. Under these conditions 3.2 molecular equivalents of ozone per mole of phenanthrene was passed into the solution. The reaction mixture was then transferred into a 500 ml. flask, and 200 ml. of aqueous solution containing 70 grams of sodium bicarbonate per liter of solution was added. A considerable quantity of gas evolved from the solution. The ketone was then removed by distillation at atmospheric pressure to leave the bicarbonate solution, which contained a small amount of neutral oil. The neutral material was extracted with 50 ml. of chloroform, and the chloroform was evaporated; 0.6 grams of yellow-orange oil remained. This material was identified as crude 2,2'-biphenyldicarboxaldehyde by means of its infrared spectrum. Upon acidification of the bicarbonate solution with concentrated hydrochloric acid, 8.6 grams (63.2% yield) of diphenic acid melting at 224 to 228° C. were precipitated.

Example IX

The procedure was the same as that described above, except that the solvent mixture consisted of 150 ml. of acetone and 50 ml. of water. The diphenic acid isolated weighed 8.35 grams (61.3% yield) and melted at 225 to 228° C.

Example X

The procedure was the same as that described in Example VIII, except that the solvent was 200 ml. of commercial acetone (which normally contains 1 to 2% water). The diphenic acid obtained weighed 6.4 grams (47.1% yield) and melted at 223 to 228° C.

Example XI

The procedure was the same as that described in Example VIII, except that the reaction mixture was maintained at a temperature of —37 to —15° C. (Dry Ice-alcohol bath) during ozonation. The diphenic acid obtained weighed 8.5 grams (62.5% yield) and melted at 146 to 200° C.

Example XII

The procedure was the same as that described in Example VIII, except that the solvent consisted of 175 ml. of methyl ethyl ketone and 25 ml. of water. The diphenic acid obtained weighed 8.8 grams (64.7% yield) and melted at 222 to 228° C.

Example XIII

The procedure was the same as that described in Example VIII, except that the solvent consisted of 175 ml. of methyl isobutyl ketone and 25 ml. of water. The diphenic acid obtained weighed 8.7 grams (64.0% yield) and melted at 202 to 218° C.

Example XIV

A suspension of 10 grams purified phenanthrene suspended in 150 ml. of tertiary butyl alcohol was treated for 5 hours in a 500-ml. cylindrical reaction vessel having a 6-cm. diameter porous bottom, with a mixture of ozone and oxygen (approximately 5 weight percent ozone) at a flow rate of 17 liters per hour. Under these conditions 2.08 moles of ozone per mole of phenanthrene passed into the reaction mixture. The almost colorless solution was then transferred into a 500-ml. flask, and 200 ml. of aqueous 7% sodium bicarbonate solution was added. A considerable quantity of gas evolved from the solution. The tertiary butyl alcohol was then removed by distillation at atmospheric pressure to leave the bicarbonate solution, which contained a small amount of neutral oil. The neutral material was extracted with 50 ml. of chloroform, and the chloroform was evaporated; 1.1 grams of viscous yellow-orange oil remained. The solution was then made strongly acid with concentrated hydrochloric acid. Diphenic acid precipitated, and the mixture was cooled in an ice bath for 30 minutes. Filtration of the mixture yielded 8.89 grams (65.4% yield) of technical-grade diphenic acid that melted at 218 to 225° C. (melting point of pure acid, 229 to 230° C.).

Example XV

A mixture of pure phenanthrene (10.0 grams, 0.056 mole), tertiary butyl alcohol (175 ml.), and water (25 ml) was treated with approximately 2.3 weight percent ozone (in oxygen) at room temperature (30° C.) and a flow rate of 102 liters per hour for 2 hours and 48 minutes. Under these conditions, 8.7 grams (0.181 mole) of ozone were passed into the reaction mixture (mole ratio of ozone to phenanthrene, 3.2). The mixture was stirred with a magnetic stirrer. The ozonation flask was essentially a tube with a gas inlet at the bottom, a sealed-in fritted disc just above the inlet, and an outlet at the top. At the end of the reaction the colorless solution was transferred into a one-liter flask, and 200 ml. of 7% aqueous sodium bicarbonate solution was added. The azeotrope of tertiary butyl alcohol and water (boiling point 80° C.) was removed by distillation at atmospheric conditions. A small amount of neutral material remained in the bicarbonate solution, and this was extracted with two 50-ml. portions of chloroform. Evaporation of the chloroform yielded 0.4 gram (3.4% yield) of 2,2'-biphenyldicarboxaldehyde. Acidification of the bicarbonate solution with concentrated hydrochloric acid yielded 9.4 grams (69.1% yield) of 2,2'-diphenic acid that melted at 224 to 229° C. and had a neutralization equivalent of 124. Pure diphenic acid melts at 229 to 231° C. and has a neutralization equivalent of 121.

For each mole of phenanthrene (178.15 grams) processed, we may employ from 900 to 3600 ml. of the alcohol and from 2700 to 4500 ml. of 7% sodium bicarbonate solution. We preferably use from 1800 to 2700 ml. of alcohol and from 3400 to 3800 ml. of the bicarbonate solution. The gram-mole ratio of ozone used, to phenanthrene, may vary from 2 to 3.5. Tertiary amyl alcohol may be used instead of tertiary butyl. The suspending medium may include other solvents such as ethyl acetate or ethylene dichloride, along with teritary butyl alcohol and water, e.g., 175 ml. ethyl acetate, 25 ml. water and 10 ml. tertiary butyl alcohol.

While purified phenanthrene is specified in the foregoing examples, technical-grade phenanthrene may be used with satisfactory results. In general, for every 10 grams of phenanthrene we prefer to use from 150 to 600 ml. of aliphatic ketone, from 50 to 200 ml. of water and 3 to 3.5 molecular equivalents of ozone per mole of phenanthrene.

It will be evident that our invention provides a simple and efficient method for making the dialdehyde and 2,2'-diphenic acid from a cheap, readily available starting material.

Although we have disclosed herein the preferred practices of our invention, we intend to cover as well any change or modification therein which may be made without departing from the spirit and scope of the invention.

We claim:
1. A method of making 2,2'-diphenic acid comprising suspending phenanthrene in a tertiary alcohol selected from the group consisting of tertiary amyl and tertiary butyl alcohols, passing ozone through the suspension until at least 2 moles of ozone have reacted with each mole of phenanthrene, and distilling the alcohol from the 2,2'-diphenic acid thus formed.

2. The method defined in claim 1, characterized by adding an aqueous solution of sodium bicarbonate to the reaction products, and adding acid to the solution to precipitate the product.

3. A method of making 2,2'-biphenyldicarboxaldehyde which consists in ozonining phenanthrene in a liquid medium selected from the group consisting of tertiary amyl alcohol, tertiary butyl alchool, acetone, methyl ethyl ketone and methyl isobutyl ketone, until the mole ratio of ozone combined with phenanthrene to the amount of phenanthrene originally present is about unity, treating the reacted mixture with ammonium hydroxide, separating the liquid medium from the precipitate, 5-hydroxy-5H-dibenz[c,e]azepine, thus formed, dissolving the precipitate in dilute acid, allowing the solute to hydrolize in the solution and separating from the acid the precipitate, 2,2'-biphenyldicarboxaldehyde, formed by hydrolysis.

4. A method of converting phenanthrene which consists in ozonizing a suspension of phenanthrene in a solvent selected from the group consisting of tertiary amyl alcohol, tertiary butyl alcohol, acetone, methyl ethyl ketone, and methyl isobutyl ketone until about 3.2 molecular equivalents of ozone per mole of phenanthrene have reacted with the phenanthrene, adding dilute aqueous sodium bicarbonate to the suspension, distilling off the solvent from the suspension and adding hydrochloric acid to the remainder thereby precipitating 2,2'-diphenic acid, and filtering the suspension to collect said diphenic acid.

References Cited in the file of this patent
UNITED STATES PATENTS

| | | |
|---|---|---|
| 2,898,350 | Sturrock et al. | Aug. 4, 1959 |
| 2,942,030 | Sturrock et al. | June 1, 1960 |

UNITED STATES PATENT OFFICE
CERTIFICATE OF CORRECTION

Patent No. 3,118,934

January 21, 1964

Robert H. Callighan et al.

It is hereby certified that error appears in the above numbered patent requiring correction and that the said Letters Patent should read as corrected below.

Column 1, line 52, for "reatment" read -- treatment --; column 2, line 19, in the illustrated reaction, for "HaHCO$_3$" read -- NaHCO$_3$ --; column 5, line 14, for '"Ildar"' read -- "Ilidar" --; line 67, for "grams" read -- gram --; column 8, line 11, for "ozonining" read -- ozonizing --; line 13, for "alchool" read -- alcohol --.

Signed and sealed this 16th day of June 1964.

(SEAL)
Attest:

ERNEST W. SWIDER
Attesting Officer

EDWARD J. BRENNER
Commissioner of Patents